United States Patent [19]

Johnson

[11] Patent Number: 4,504,628

[45] Date of Patent: Mar. 12, 1985

[54] POLYMERIZABLE UV LIGHT STABILIZERS FROM ISOCYANATOALKYL ESTERS OF UNSATURATED CARBOXYLIC ACIDS

[75] Inventor: Mark R. Johnson, Breckenridge, Mich.

[73] Assignee: The Dow Chemical Company, Midland, Mich.

[21] Appl. No.: 484,793

[22] Filed: Apr. 14, 1983

Related U.S. Application Data

[63] Continuation-in-part of Ser. No. 344,838, Feb. 1, 1982, abandoned.

[51] Int. Cl.$^3$ .................. C07C 125/04; C07D 253/08; C08F 279/02; C08F 246/00; C08F 236/06; C08F 226/06; C08F 222/22; C08K 5/16; C08K 5/21; C08K 5/34

[52] U.S. Cl. .......................... 525/278; 524/91; 524/99; 524/103; 524/199; 525/374; 525/375; 525/384; 525/386; 526/301; 548/259; 560/24; 560/25; 560/27; 560/32; 560/33; 560/132; 560/157; 560/158; 560/163

[58] Field of Search ............... 560/132, 157, 163, 158, 560/25, 24, 27, 32, 33; 526/301; 525/278; 548/259; 524/91, 199; 424/59, 60, 269, 286

[56] References Cited

U.S. PATENT DOCUMENTS

| | | | |
|---|---|---|---|
| 3,086,988 | 4/1963 | Gordon | 260/488 |
| 3,391,110 | 7/1968 | Coleman | 260/47 |
| 3,395,198 | 7/1968 | Taniguchi et al. | 526/312 |
| 3,847,930 | 11/1974 | Randell et al. | 524/100 |
| 3,849,373 | 11/1974 | Siegle et al. | 525/386 |
| 3,953,402 | 4/1976 | Kline | 526/227 |
| 3,960,809 | 6/1976 | Ramey et al. | 524/99 |
| 4,002,733 | 1/1977 | Degen et al. | 548/259 |
| 4,129,586 | 12/1978 | Sheppard et al. | 560/163 |
| 4,179,548 | 12/1979 | Schroeter et al. | 525/329 |
| 4,233,425 | 11/1980 | Tefertiller et al. | 525/455 |
| 4,310,650 | 1/1982 | Gupta | 525/219 |
| 4,320,221 | 3/1982 | Hoffman | 528/69 |

FOREIGN PATENT DOCUMENTS

| | | |
|---|---|---|
| 46-26860 | 4/1971 | Japan . |
| 47-29199 | 1/1972 | Japan . |
| 1407670 | 9/1975 | United Kingdom . |

OTHER PUBLICATIONS

Daniel R. Olson et al, "UV Screen Progenitors, Thermally Labile Urethane Derivatives of Hydroxy Benzutriazoles and Hydroxybenzophenones", J. Applied Polymer Science, vol. 22, 2165-2172 (1978).

David A. Tirrell, "Polymeric Ultraviolet Absorbers" Polymer News, 1981, vol. 7, 104-110.

D. Bailey et al., "Polymeric Ultraviolet, Absorbers" J. Macromol. Sci. Rev. Macromol. Chem. C14(2), 267-293 (1976).

Tronnier *Acta Fac. Med. Univer. Brun.* 1972, No. 40 (Pt. 1), 211-219.

*Primary Examiner*—Veronica P. Hoke

[57] ABSTRACT

An addition polymerizable UV stabilizer is prepared by reacting an isocyanatoalkyl ester of an addition polymerizable carboxylic acid (such as 2-isocyanatoethyl methacrylate) with an UV stabilization functionality bearing an active hydrogen moiety which is reactive with the isocyanate (such as 2-hydroxy-4-(2-hydroxyethoxy)benzophenone).

15 Claims, No Drawings

POLYMERIZABLE UV LIGHT STABILIZERS FROM ISOCYANATOALKYL ESTERS OF UNSATURATED CARBOXYLIC ACIDS

CROSS-REFERENCE TO RELATED APPLICATIONS

This application is a continuation-in-part of application Ser. No. 344,838, filed Feb. 1, 1982, now abandoned.

BACKGROUND OF THE INVENTION

This invention relates to ultra-violet (UV) stabilizers which are addition polymerizable and to polymers containing such stabilizers.

The demands made upon polymeric materials in industrial, commercial and consumer fields are continually increasing. To improve polymers, the use of UV stabilizers has been extremely important. UV radiation accelerates the physical and chemical deterioration of polymeric substrates and causes the fading of colors, the yellowing of cellulosics, the photo-oxidation of polyolefins, the dehydrochlorination of poly(vinylchloride), the imbrittlement of coatings, etc. UV stabilizers extend the useful life of irradiated polymers by absorbing UV radiation and/or absorbing the energy by intermolecular energy transfer and harmlessly dissipating the energy.

Three main factors affect UV stabilizer performance. The first is the intrinsic activity of the UV stabilization functional group. This may be evaluated by a number of conventional methods. The second factor is the compatibility or solubility of the stabilizer in the polymer system. This second factor is important in situations wherein a polymer may initially have a UV stabilizer dispersed throughout the system, however, upon aging the UV stabilizer may migrate from one polymer phase to another polymer phase or to the surface of the polymer. A third factor is the leaching or volatility of the UV stabilizer. This third factor, the leaching of the stabilizer, is very important in many situations. For many applications the UV stabilizer must be capable of withstanding multiple detergent washings and/or dry cleanings. In food or clothing related applications, the UV stabilizer must not be released so as to be absorbed by the body. In extraterrestial environments the UV stabilizers must have extremely low vapor pressures to remain in the polymer even at very high temperatures and very low pressures.

A number of approaches have been tried to solve the problem of the volatilization of UV stabilizers in polymeric materials. One such approach has been to chemically combine the UV stabilizer with the polymeric material sought to be protected. These attempts, however, have not been wholly satisfactory. The chemically combined stabilizers disclosed in the literature are generally expensive to manufacture in that they require synthesis routes which are energy intensive and time consuming. In addition, the products produced by these methods are often inadequate in their ability to function as a UV stabilizer. Further, the synthesis routes described in the literature generally produce large amounts of impurities which interfere with the UV stabilizer properties or other aspects of the polymer system in which they are employed. These routes also characteristically have low product yields.

Bailey et al., *Polymeric Ultraviolet Absorbers*, J. Macromol. Sci.—Rev. Macromol. Chem, C14 (2), pp. 267–293 (1976), and Kline, U.S. Pat. No. 3,953,402 (1976), discuss polymerizable UV absorbers made through an esterification reaction. These syntheses are energy intensive, and the products require considerable processing to obtain a relatively pure compound.

Coleman, U.S. Pat. No. 3,391,110 (1968), discloses a condensation polymer which has both a UV stabilizer moiety and a urethane linkage. There is no suggestion, however, of an addition polymerizable UV absorber.

Schroeter et al., U.S. Pat. No. 4,179,548 (1979), teaches a UV stabilizer which is useful in an addition polymer, but the UV stabilizer itself is not addition polymerizable. Further, although Schroeter et al. teach the reaction of a UV stabilizer with an isocyanate to form an urethane linkage, they do it for the purpose of temporarily disabling the UV stabilizer so that an UV radiation curing system may be used.

Accordingly, it would be desirable to have a polymerizable UV stabilizer which has high UV stabilization activity, is energy efficient to manufacture, may be quickly and easily manufactured, is relatively free of harmful impurities, and may be produced in high yield.

SUMMARY OF THE INVENTION

In one aspect, the invention is a polymerizable UV stabilizer comprising a compound of the formula:

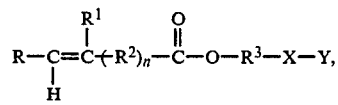

in which R is H or an organic radical, $R^1$ is H or $CH_3$, $R^2$ is a $C_1$–$C_{20}$ organic radical, n is 1 or 0, R, $R^1$, $R^2$ and n are all such that the C=C double bond is polymerizable, $R^3$ is a $C_1$–$C_{12}$ organic radical, X is a urethane-type linkage with the isocyanate residue proximal to $R^3$, and Y is a UV stabilization functionality.

In another aspect, the invention is a method of making such a UV stabilizer. In yet another aspect, the invention is a polymer having such a UV stabilizer incorporated therein.

Surprisingly, the UV stabilizers of the invention have high UV stabilization activity, are energy efficient to manufacture, may be quickly and easily manufactured, are relatively free of impurities, and may be readily addition polymerized.

DETAILED DESCRIPTION OF THE INVENTION

The polymerizable UV stabilizers of the present invention may be generally described as esters of ethylenically unsaturated carboxylic acids, the alcohol residues of which contain a urethane-type linkage proximal to the acyl group of the ester and a UV stabilization functionality distal to the acyl group. These esters may be the esters of any addition polymerizable carboxylic acid. While typically not prepared directly from carboxylic acids, these esters correspond to esters of, for instance, acrylic acid, methacrylic acid, and cis- and trans-2-butenoic acid. While not preferred, addition polymerizable dicarboxylic acids such as cis- and trans-2-butendioic acids (maleic and fumaric acids) may be used.

The polymerizable UV stabilizers of the present invention may also be described by the formula:

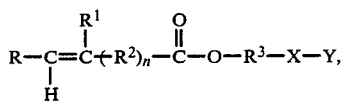

in which R is H or an organic group; $R^1$ is H or $CH_3$; $R^2$ is a $C_1$–$C_{20}$ organic group; n is 0 or 1; R, $R^1$, $R^2$ and n are all such that the C=C double bond is addition polymerizable; $R^3$ is a $C_1$–$C_{12}$ organic group; X is a urethane-type linkage with the isocyanate residue proximal to $R^3$ and Y is a UV stabilization functionality. In preferred embodiments, R is H; n is 0; and $R^3$ is a $C_1$–$C_5$ organic chain.

In the practice of the instant invention, the preferred method for making the polymerizable UV stabilizers involves the reaction of an isocyanatoalkyl ester of an ethylenically unsaturated carboxylic acid with a UV stabilization functionality having an active hydrogen moiety. Preferred isocyanatoalkyl esters include 2-isocyanatoethyl acrylate and 2-isocyanatoethyl methacrylate (IEM). Suitable means for preparing these isocyanate precursors are taught, for instance, in U.S. Pat. Nos. 4,260,811; 4,278,809; 4,310,688; 4,338,162; British Pat. No. 1,252,099; and Canadian Pat. No. 874,457.

The UV stabilization functionality of the instant invention may be any UV stabilization functionality which is not excessively reactive with isocyanate moieties under the conditions employed for preparation of the polymerizable stabilizer. That is to say, one cannot use a UV stabilizer wherein the stabilization moiety will be rendered substantially inactive by reaction with the isocyanate.

The most important commercial UV stabilizers may be grouped into five categories of compounds which are believed to function by directly absorbing UV radiation. They are the 2-hydroxybenzophenones, the 2-(2'-hydroxyphenyl)benzotriazoles, the salicylates, the aryl-substituted acrylates, and the p-aminobenzoates. In addition to these absorbers, an important class of nonabsorbing stabilizers are the nickel chelates, complexes and salts of aromatic systems. These are believed to provide protection by a mechanism which involves a direct transfer of the electronic energy from the excited state of the polymer molecule to the stabilizer molecules. Another group of nonabsorbing compounds which become light stabilizers have the facility to photochemically rearrange or be converted to UV absorbing materials upon exposure to UV radiation. An example is the conversion of nonabsorbing m-hydroxyphenylbenzoate to the absorbing 2,4-dihydroxybenzophenone. A large number of specific UV stabilizers is listed in the *Encyclopedia of Chemical Technology*, Vol. 21, page 115 (2d edition, 1970).

Although the UV stabilization functionalities useful in the invention are commercially available, they often do not have other functionalities which are suitable for reaction with the isocyanatoalkyl ester, and must be suitably modified. The UV stabilizer must be modified such that it bears a pendant group which will react with an isocyanate moiety to produce a "urethane-type" linkage. By the term "urethane-type" linkage is meant to include not only a true urethane linkage

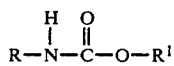

wherein an isocyanate is reacted with an organic hydroxyl group, but also to include the reaction of an isocyanate with any active hydrogen moiety. An active hydrogen moiety is generally any moiety which will react with an isocyanate group. One means of predicting this tendency is the Zerewitinoff test described by Woller in *Journal of the American Chemical Society*, Vol. 49, page 3181 (1927). Specific examples of suitable active hydrogen compounds include amines, alcohols, thiols, carboxylic acids and carboxamides. Amines and alcohols are the preferred, with alcohols being most preferred.

Compounds which have an active hydrogen moiety suitable for reaction with the isocyanate are known in the art. Examples of suitable 2-(2-hydroxy phenyl)benzotriazole UV stabilizers include 2-[2-hydroxy-5-(ethylamino)phenyl]benzotriazole whose ethylamino group is reactive with isocyanates (compound disclosed in Japanese Pat. No. 72-29,199) and 2-(2-hydroxy-5-aminophenyl)benzotriazole whose amino group is reactive with isocyanates (compound disclosed in Japanese Pat. No. 71-26,860). Suitable salicylate stabilizers include ethylene glycol monosalicylate whose hydroxyethyl group is reactive with isocyanates (compound disclosed in Tronnier, *Acta Fac. Med. Univer. Brun.*, 1972, No. 40 (Pt. 1), 211–19) and (4-hydroxy phenyl)-salicylate whose 4-hydroxy group is reactive with isocyanates (compound disclosed in Japanese Pat. No. 71-26,860). A variety of suitable hydroxyl substituted aryl acrylate UV stabilizers whose hydroxyl groups are reactive with isocyanates are also known (compounds disclosed in Netherlands Patent Application No. 293,502).

The reactions necessary to provide the UV stabilization functionality with a suitable active hydrogen moiety are varied, depending upon the specific type of UV stabilization functionality, and the other moieties available for reaction. While these steps are not shown in the literature as a group, for this specific use, the individual reactions are well known. For instance, one may react 2,4-dihydroxybenzophenone with 2-bromoethanol-(ethylene bromohydrin) to obtain 2-hydroxy-4-(2-hydroxyethoxy)benzophenone, as taught by U.S. Pat. No. 3,086,988. In a similar manner, one may use 2-chloroethanol(ethylene chlorohydrin) as the reactant, as taught by U.S. Pat. No. 3,391,110. While it would be possible to use 2,4-dihydroxybenzophenone directly, the 4-(2-hydroxyethoxy) derivative, whose hydroxyethoxy group is reactive with isocyanates, will produce a more stable product when reacted with an isocyanate.

The UV stabilization functionality which has an active hydrogen moiety or which has been provided with an active hydrogen moiety may be reacted with the isocyanate moiety of the isocyanatoalkyl ester under conditions conventional for urethane formation reactions. Preferably, the reaction takes place at room temperature with a small amount of a conventional urethane catalyst. The reaction takes place in a relatively short time, yielding a pure product at near 100 percent conversion. Suitable reaction conditions are well known to those skilled in the art and are taught, for instance, in U.S. Pat. No. 4,233,425.

The polymerizable UV stabilizers may be used as other UV stabilizers by simply blending it with the material it protects. However, a particular advantage of the UV stabilizers of the invention is their ability to become bound to the polymer in which they are used, either by being copolymerized with the monomers of the polymer or by being grafted onto the polymer after the polymer has been prepared. The latter approach is useful in that it allows the polymer to be premanufactured and provided with UV stabilizers only when the need arises.

When the UV stabilizer is copolymerized, it can be added like any other monomer and becomes part of the polymer. When it is grafted onto the polymer, it is added to the polymer with a sufficient amount of an initiator so that grafting occurs. In grafting, it is possible to add a small amount of another addition polymerizable monomer when the UV stabilizer is added. Grafting is taught, for example, in U.S. Pat. No. 4,155,955.

One possible use of the stabilizers of the invention is to homopolymerize them or to polymerize them with a minor portion of another compound, in order to build their molecular weight and reduce their volatility. This may be desirable, of instance, when the need arises to add a relatively nonextractable and nonvolatile UV stabilizer to an already manufactured polymer.

In some polymer systems one portion of the system may be more susceptible to UV degradation than others. For instance, a blended or encapsulated polymer system made with butadiene and styrene will generally show much more UV degradation in the butadiene phase. However, by polymerizing the UV stabilizer with the butadiene portion, the stabilizer will be in the phase where it is needed and will not be able to migrate to the other phase.

Further details of the invention will be apparent from the following examples which are provided to illustrate the invention and are not intended to limit the scope of the invention. In the examples, all parts and percentages are by weight, unless otherwise specified.

EXAMPLE 1

A solution of 2.00 g (7.75 millimoles) of 2-hydroxy-4-(2-hydroxyethoxy)benzophenone and 20 ml of methylene chloride is chilled in an ice bath. To this 2 mg Ionol® inhibitor, 1.20 g (7.74 millimoles) of 2-isocyanatoethyl methacrylate and 1 drop of dibutyltin diacetate are added. The solution is stirred for 48 hours as the ice bath is allowed to melt. The solvent is removed under reduced pressure to yield an oil which crystallizes upon standing. The crystals have a weight of 3.2 g (100 percent of theoretical) and a melting point of 45°–48° C.

EXAMPLE 2

A sample of 200 g of a 40 percent solids latex (composition 58.2 percent styrene, 40.0 percent butadiene, 1.8 percent itaconic acid) is mixed with a solution of 0.8 g (1.937 millimoles) of the copolymerizable UV stabilizer from Example 1 in 1.0 ml styrene and 0.2 ml methanol. Following this, a solution of 60 mg sodium persulfate and 0.5 ml of water is added and the latex is heated to 75° C. under a nitrogen atmosphere. The latex is held at 75° C. for 4 hours and allowed to cool to room temperature. The latex is coated onto paper strips which are dried briefly in an oven and then exposed in a Fadeometer UV chamber for 100 hours.

COMPARATIVE EXAMPLE 1

A latex sample identical to that used in Example 2 is blended with 0.55 percent 2,4-dihydroxybenzophenone as a light stabilizer. The quantity of stabilizer gives the latex the same molar concentration of stabilizer as the latex of Example 2. This sample is similarly coated onto paper, briefly dried, and exposed to 100 hours in a Fadeometer UV cabinet.

A comparison of the UV exposed samples from Example 2 and Comparative Example 1 show less yellowing in the sample from Example 2 than the sample from Comparative Example 1.

What is claimed is:

1. A vinyl polymerizable UV light stabilizer comprising a compound of the formula:

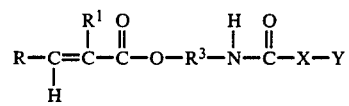

in which R is H or $CH_3$; $R^1$ is H or $CH_3$; R and $R^1$, are all such that the C=C double bond is vinyl polymerizable, $R^3$ is a $C_1$–$C_5$ alkyl radical, X is a linkage derived from the active isocyanate group reacted with an organic hydroxyl group or other active hydrogen moiety pendent from a UV light stabilizer; and Y is a UV light stabilizer.

2. The UV light stabilizer of claim 1 wherein R is H.

3. The UV light stabilizer of claim 1 wherein R is H; and $R^3$ is a $C_1$–$C_5$ alkyl radical.

4. The UV light stabilizer of claim 1 wherein R is H; $R^1$ is $CH_3$; and $R^3$ is a $C_2$ alkyl chain.

5. The UV light stabilizer of claim 1 wherein X is the reaction product of an isocyanate and a hydroxyl group.

6. The UV light stabilizer of claim 1 wherein Y is a 2-hydroxybenzophenone moiety.

7. A method of synthesizing the polymerizable UV light stabilizer of claim 1 comprising reacting an isocyanatoalkyl ester of an ethylenically unsaturated carboxylic acid with a UV light stabilizer bearing an active hydrogen moiety.

8. A polymeric composition comprising the copolymer of an addition polymerizable organic compound and the UV light stabilizer of claim 1 wherein the UV light stabilizer has been copolymerized with the organic compound.

9. A polymeric composition comprising an addition polymerized organic compound and the UV light stabilizer of claim 1 wherein the UV light stabilizer has been grafted onto the polymer.

10. The composition of claim 8 or 9 wherein said composition is a latex.

11. A vinyl polymerizable UV light stabilizer comprising an ester of an ethylenically unsaturated carboxylic acid, the alcohol residue of which includes a urethane-type linkage as follows:

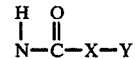

wherein X is a linkage derived from the active isocyanate group reacted with an organic hydroxyl group or other active hydrogen moiety pendent from a UV light stabilizer; and Y is a UV light stabilizer.

12. The UV light stabilizer of claim 11 wherein the UV stabilizer comprises the reaction product of an isocyanatoalkyl ester of an unsaturated carboxylic acid with a UV light stabilizer bearing an active hydrogen moiety.

13. The UV light stabilizer of claim 12 wherein the active hydrogen moiety is a hydroxyl moiety.

14. The UV light stabilizer of claim 13 wherein the UV light stabilizer comprises the reaction product of 2-isocyanatoethyl methacrylate and 2-hydroxy-4-(2-hydroxyethoxy)benzophenone.

15. The UV light stabilizer of claim 12 wherein the UV light stabilizer is a 2-hydroxybenzophenone, a 2-(2'-hydroxyphenyl)benzotriazole, a salicylate, an aryl-substituted acrylate or a p-aminobenzoate.

* * * * *